(12) United States Patent
Haul

(10) Patent No.: US 6,516,810 B1
(45) Date of Patent: Feb. 11, 2003

(54) PIPE JUNCTION FOR PNEUMATIC TRANSFER OF ROD-SHAPED SMOKERS' PRODUCTS

(75) Inventor: Michael Haul, Kröppelshagen (DE)

(73) Assignee: Hauni Maschinenbau AG, Hamburg (DE)

( * ) Notice: Subject to any disclaimer, the term of this patent is extended or adjusted under 35 U.S.C. 154(b) by 96 days.

(21) Appl. No.: 09/643,687

(22) Filed: Aug. 24, 2000

(30) Foreign Application Priority Data

Aug. 31, 1999 (DE) .......................................... 199 41 268

(51) Int. Cl.⁷ ................................................. A24C 1/14
(52) U.S. Cl. .......................... 131/282; 131/96; 131/108; 131/110; 406/182
(58) Field of Search ................................ 131/280, 282, 131/96, 108, 110, 910, 909, 904; 406/115, 30, 31, 32, 182, 183, 184; 198/493

(56) References Cited

U.S. PATENT DOCUMENTS

| | | | | |
|---|---|---|---|---|
| 2,252,501 A | * | 8/1941 | Foresman ..................... | 110/171 |
| 3,188,145 A | * | 6/1965 | Strong ......................... | 406/157 |
| 3,789,744 A | * | 2/1974 | Wahle .......................... | 131/88 |
| 3,902,682 A | * | 9/1975 | Woll ............................ | 137/874 |
| 3,945,682 A | * | 3/1976 | Hoagland et al. ............ | 198/402 |
| 3,967,858 A | * | 7/1976 | Atwell et al. ............. | 198/347.2 |
| 3,974,007 A | | 8/1976 | Greve ........................... | 156/64 |
| 4,063,572 A | * | 12/1977 | Anderegg et al. ..... | 137/614.11 |
| 4,223,700 A | * | 9/1980 | Jones ....................... | 137/625.46 |
| 4,252,479 A | * | 2/1981 | Scherfenberg ............... | 406/182 |
| 4,372,710 A | | 2/1983 | Kasparek et al. | |
| 4,442,865 A | * | 4/1984 | Shigeo .................... | 137/625.46 |
| 4,503,868 A | * | 3/1985 | Coyte ........................ | 131/282 |
| 4,886,401 A | * | 12/1989 | Andrews et al. ............... | 193/23 |
| 5,106,241 A | * | 4/1992 | Shinagawa et al. ......... | 406/182 |
| 5,135,008 A | | 8/1992 | Oesterling et al. ............ | 131/94 |
| 5,354,152 A | * | 10/1994 | Reinhardt et al. .......... | 406/182 |
| 5,622,457 A | * | 4/1997 | Thiele ........................... | 406/1 |
| 5,651,643 A | * | 7/1997 | Haul et al. .................... | 406/11 |
| 5,931,611 A | * | 8/1999 | Worsham ..................... | 406/182 |
| 6,030,152 A | * | 2/2000 | Steele ......................... | 406/182 |
| 6,074,136 A | * | 6/2000 | Steele ......................... | 406/182 |
| 6,210,080 B1 | * | 4/2001 | Haul et al. ..................... | 406/13 |
| 6,263,883 B1 | * | 7/2001 | Furmanski et al. ......... | 131/282 |
| 6,305,884 B1 | * | 10/2001 | Lewis et al. ................. | 406/107 |
| 6,354,770 B1 | * | 3/2002 | McKinnis ................... | 406/182 |

FOREIGN PATENT DOCUMENTS

| | | |
|---|---|---|
| DE | 29 29 406 | 2/1981 |
| DE | 31 03 060 | 12/1981 |
| GB | 2 068 875 | 8/1981 |
| WO | 97/16365 | 5/1997 |
| WO | 99/22611 | 5/1999 |

OTHER PUBLICATIONS

"Conveyor System", Research Disclosure, GB, Industrial Opportunities Ltd., Havant, Oct. 1996, pp. 671–672, XP 000639939.

* cited by examiner

Primary Examiner—Steven P. Griffin
Assistant Examiner—Carlos Lopez
(74) Attorney, Agent, or Firm—Robert Kinberg; Venable, LLP

(57) ABSTRACT

Apparatus for pneumatically conveying filter rod sections from a sender to a remote cigarette filter tipping machine has a first switching device which receives filter rod sections from a single outlet of the sender, a second switching device which delivers filter rod sections to a single inlet of the tipping machine, and at least two conduits connecting the switching devices. The first switching device can direct filter rod sections into the receiving end of either one of the conduits while establishing a path for the evacuation of piled-up filter rod sections from the other conduit. The second switching device can connect the inlet of the tipping machine with the discharge end of either of the two conduits while connecting the discharge end of the other conduit with a source of compressed air in the event of clogging of the other conduit.

10 Claims, 3 Drawing Sheets

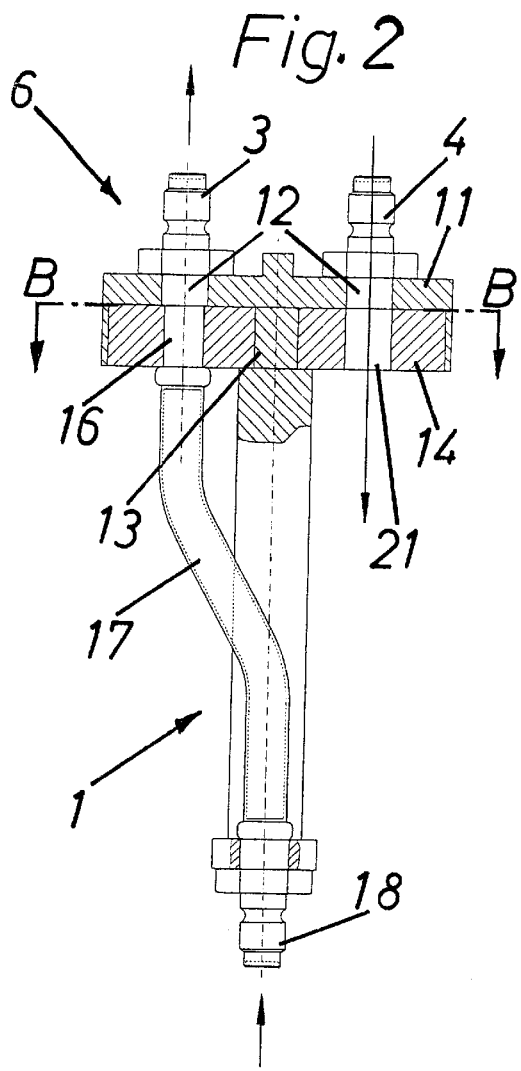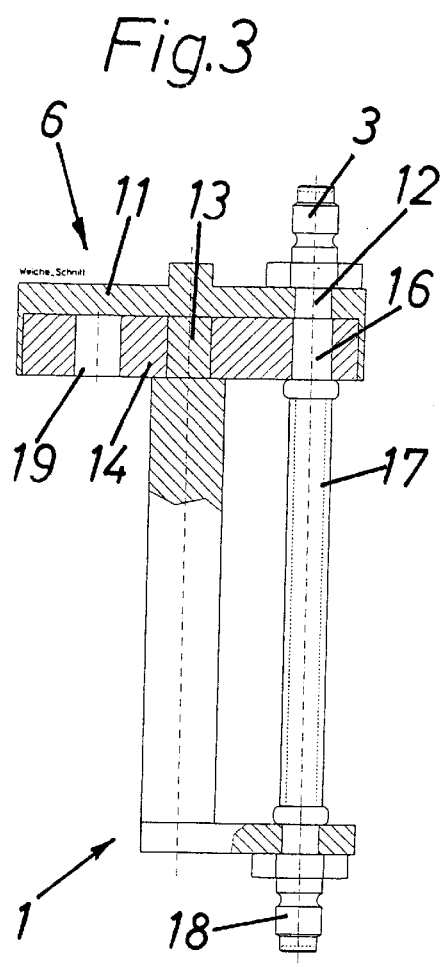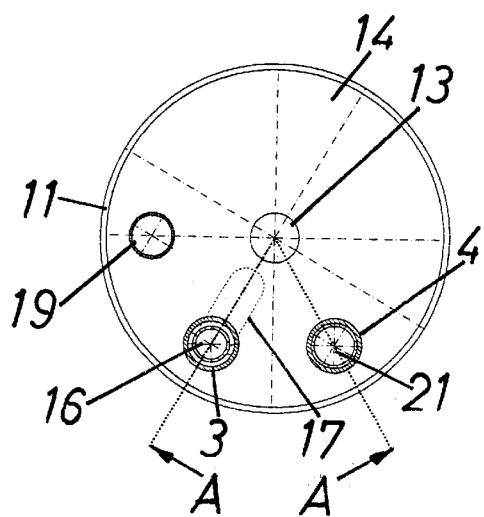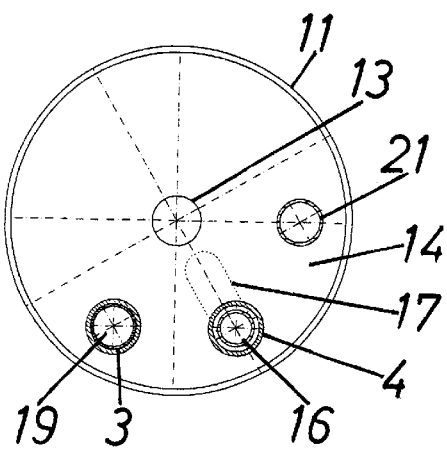

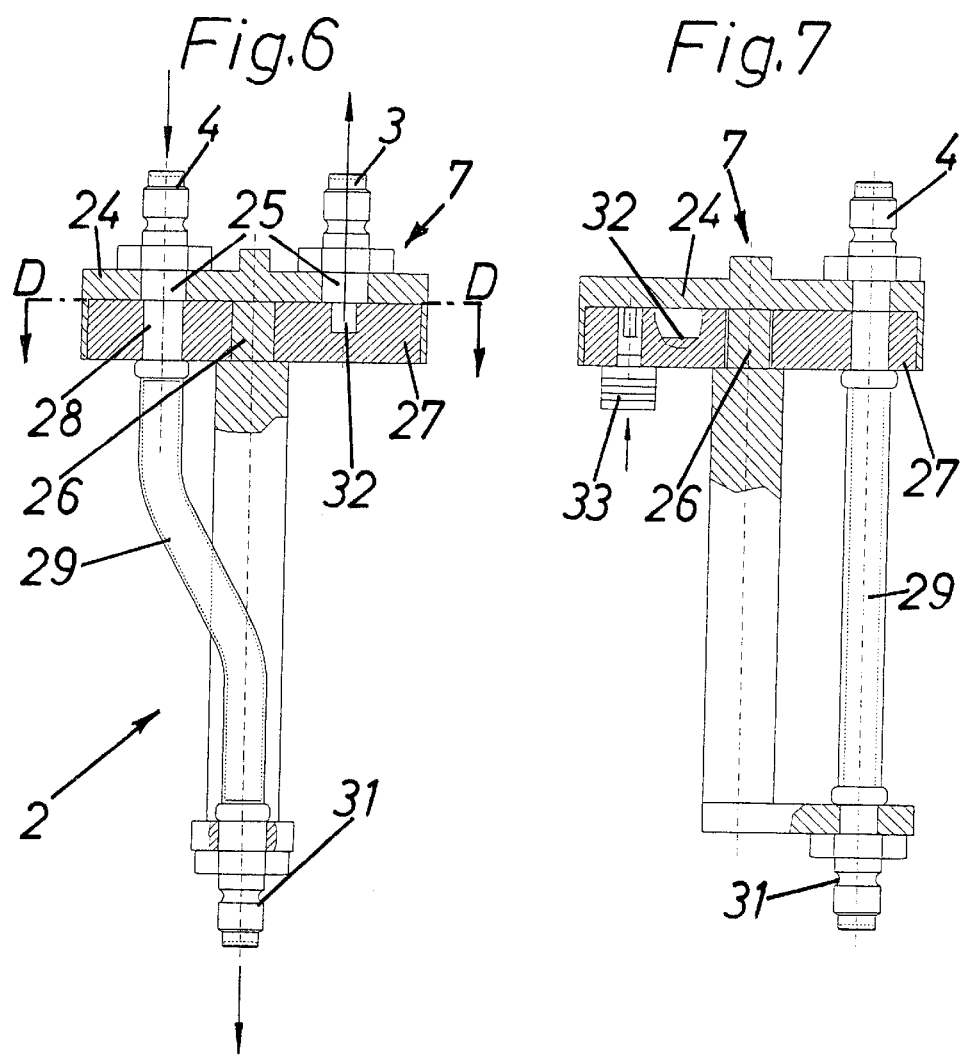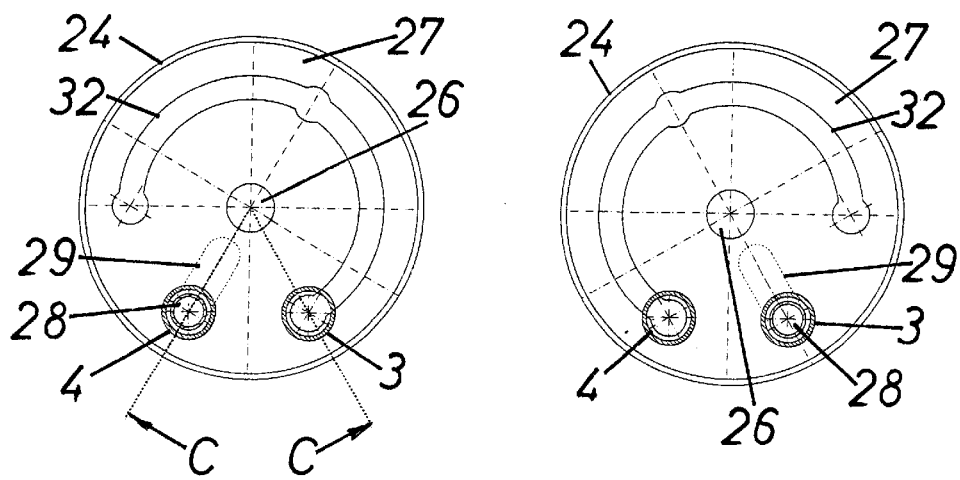

PIPE JUNCTION FOR PNEUMATIC TRANSFER OF ROD-SHAPED SMOKERS' PRODUCTS

CROSS-REFERENCE TO RELATED CASES

This application claims the priority of commonly owned German patent application Serial No. 199 41 268.5 filed Aug. 31, 1999. The disclosure of the above-referenced German patent application, as well as that of each U.S. and foreign patent and patent application mentioned in the specification of the present application, is incorporated herein by reference.

BACKGROUND OF THE INVENTION

The invention relates to pneumatic conveyor systems in general, and more particularly to improvements in apparatus for pneumatically transferring or transporting successive commodities or groups of commodities from the outlet of a supplying unit to the inlet of a receiving unit. Examples of commodities which can be readily transferred or transported in the apparatus of the present invention (e.g., from a maker to a storage facility or to a processing machine) are rod-shaped articles of the tobacco processing industry such as plain or filter cigarettes, filter rod sections and the like.

The invention also relates to improvements in methods of pneumatically conveying various commodities, such as rod-shaped articles of the tobacco processing industry.

It is often advisable, desirable or necessary to install a filter rod making machine (e.g., a machine of the type disclosed in U.S. Pat. No. 3,974,007 granted Aug. 10, 1976 to Greve for "METHOD AND APPARATUS FOR THE PRODUCTION OF FILTER ROD SECTIONS OR THE LIKE") at a distance from a so-called filter tipping machine wherein filter rod sections are united with plain cigarettes, cigars or cigarillos to form filter cigarettes, cigars or cigarillos of unit length or multiple unit length. A filter tipping machine wherein filter mouthpieces of double unit length are united with pairs of plain cigarettes of unit length to form filter cigarettes of double unit length (which are thereupon divided into pairs of filter cigarettes of unit length) is disclosed, for example, in commonly owned U.S. Pat. No. 5,135,008 granted Aug. 4, 1992 to Oesterling et al. for "METHOD OF AND APPARATUS FOR MAKING FILTER CIGARETTES". The connection between the outlet of the filter rod making machine and the inlet of the magazine of the filter tipping machine is normally established by a pneumatic conveyor which is designed to propel successive filter rod sections of desired or required length by way of a suitable conduit.

Since a modern filter tipping machine can turn out huge quantities of filter cigarettes per unit of time, it was customary to employ two pneumatic conveyors each of which was designed to receive a file of successive filter rod sections from the outlet of a discrete supplying unit and to deliver successive filter rod sections to a discrete receiving station of the filter tipping machine. Such bulky, complex and expensive connections between the source or sources of filter rod sections and the tipping machine were replaced with a simpler pneumatic conveyor which was designed to deliver a single file of filter rod sections to a single tipping machine or to another receiving or storing unit; such simplification was made possible due to recent extensive improvements in pneumatic conveyors for the transport of filter rod sections or the like.

However, such recent types of high-speed high-capacity pneumatic conveyors exhibit the drawback that any obstruction in the single path for the transport of filter rod sections from a maker or another source to a filter tipping machine or another article storing and/or processing machine or unit invariably entails extensive losses in output and potential stoppage of an entire production line wherein makers of plain cigarettes and filter rod sections cooperate with various assembling and processing machines to turn out boxes or crates of so-called cartons containing groups of packets (such as ten packets) each of which contains an array of say twenty filter cigarettes or the like.

OBJECTS OF THE INVENTION

An important object of the present invention is to provide a simple and relatively inexpensive pneumatic transporting or conveying apparatus which is much more reliable but need not be bulkier than the presently known apparatus for the transport of rod-shaped articles or the like.

Another object of the invention is to provide a pneumatic article transporting apparatus which is constructed and assembled in such a way that it can automatically eliminate pileups of stagnant articles between the outlet of an article sending unit and the inlet of an article receiving unit without the need for an interruption of the delivery of articles between such units.

A further object of the invention is to provide an apparatus which is designed to treat the conveyed commodities gently regardless of the selected rate of delivery of commodities from a single outlet of a sending unit to a single inlet of a receiving unit.

An additional object of the invention is to provide the above outlined apparatus with novel and improved means for guiding, shifting and/or otherwise manipulating the commodities between the single outlet of a sending unit and the single inlet of the receiving unit.

Still another object of the invention is to provide a novel and improved method of pneumatically transporting rod-shaped articles between a maker or a first storing device and a consumer in such a way that the rate at which the articles are being transported departs from a desired optimum rate only when such departure is dictated and/or rendered desirable by eventual malfunctioning or intentional adjustments of the maker and/or consumer or processor of such articles.

A further object of the invention is to provide a novel and improved method of counteracting undesirable effects of clogging of the route or routes between the maker and the consumer of pneumatically conveyed commodities.

Was Another object of the invention is to provide novel and improved article switching or shifting devices for use in the above outlined apparatus.

An additional object of the invention is to provide a novel and improved unclogging system for use in the above outlined apparatus.

Still another object of the invention is to provide a novel and improved process for the elimination of pileups of commodities in the above outlined apparatus without any, or any appreciable, interruption of pneumatic delivery of commodities from a single outlet of the sending unit to the single inlet of the receiving (such as storing and/or processing and/or inspecting) unit.

A further object of the invention is to provide an automated or automatic pneumatic article transporting apparatus which can deliver selected quantities of articles to a consumer for any desired period of time, irrespective of eventual frequent or infrequent, partial or complete obstruction of a chosen path for the delivery of articles from a sender to a receiver.

Another object of the invention is to provide the above outlined apparatus with novel and improved means for gathering and/or otherwise recovering those commodities which must be removed from a locale where the commodities accumulate due to a clogging within the selected path for the advancement of selected quantities of commodities from a maker or sender to a consumer or processor or storer of such commodities.

SUMMARY OF THE INVENTION

One feature of the present invention resides in the provision of an apparatus for pneumatically transferring successive articles of a series of articles (such as rod-shaped articles of the tobacco processing industry) from the outlet of an article sending unit (such as a single outlet of a maker or combined storage facility and pneumatic conveyor) to an inlet of an article receiving unit (e.g., a single inlet of a filter tipping machine). The improved apparatus comprises at least two conduits having article receiving ends separably connectable with the outlet of the sending unit and article discharging ends separably connectable with the inlet of the receiving unit, and means for selectively connecting one of the at least two conduits with the sending and receiving units and for simultaneosly disconnecting the other-conduit of the at least two conduits from the two units.

The aforementioned connecting/disconnecting means can comprise a first switching device which is operable to connect the outlet of the sending unit with the receiving end of one of the at least two conduits, a second switching device which is operable to connect the inlet of the receiving unit with the discharging end of one of the at least two conduits, and means (such as electronically or otherwise controlled motors) for operating the switching devices to establish connections between the outlet and the inlet on the one hand and the respective ends of the one conduit on the other hand while, at the same time, interrupting the connections between the inlet and the outlet on the one hand and the respective ends of the other conduit on the other hand.

In accordance with a presently preferred embodiment, each of the switching devices comprises a support and a nozzle which is movable relative to the respective support between a first position in which the two nozzles simultaneously establish communication only between the outlet of the sending unit and the receiving end of the one conduit as well as between the discharging end of the one conduit and the inlet of the receiving unit, and a second position in which the nozzles simultaneously establish communication only between the outlet of the sending unit and the receiving end of the other conduit as well as between the discharging end of the other conduit and the inlet of the receiving unit.

Each of the supports can comprise a shaft and the nozzles can include or constitute turntables which are turnable or indexible relative to the respective shafts between their respective first and second positions.

The first switching device can further comprise a first flexible tube which connects the outlet of the sending unit with the respective movable nozzle (i.e., with the nozzle of the first switching device), and the second switching device can further comprise a second flexible tube which connects the inlet of the receiving unit with the respective nozzle (i.e., with the nozzle of the second switching device).

The nozzle of the first switching device can be provided with first and second article evacuating orifices which register with the receiving ends of the one conduit and the other conduit in each of the first and second positions of the nozzle of the first switching device. The nozzle of the second switching device can be provided with an article evacuating groove which registers with the discharge ends of the other conduit and the one conduit when the nozzle of the second switching device respectively assumes its first and second positions.

The apparatus can further comprise a receptacle which is arranged to receive articles issuing from the evacuating orifices of the nozzle of the first switching device. The receptacle can include a plurality of (e.g., discrete) containers one of which is positioned to receive articles issuing from one evacuating orifice of the nozzle of the first switching device in the first position of such nozzle and another of which is positioned to receive articles issuing from the other evacuating orifice of the nozzle of the first switching device in the second position of such nozzle.

If the nozzle of the first switching device includes or constitutes a turntable which is indexible relative to the respective support about a predetermined axis (such as the pivot axis defined by the aforementioned shaft of the support or housing of the first switching device), the evacuating orifices of the nozzle of the first switching device and an additional orifice of such nozzle are or can be located at the same distance from the predetermined axis and the additional orifice can be provided in the support of the first switching device midway between the two evacuating orifices. The additional orifice serves to communicate with the one conduit in the first position of the nozzle of the first switching device The nozzle and/or the support of the second switching device can define a channel (such as the aforementioned groove), and the apparatus can further comprise a source of compressed air or another suitable gaseous fluid which is connectable with the channel. Such channel communicates with the discharging end of the other conduit in the one position and with the discharging end of the one conduit in the other position of the nozzle of the second switching device.

The second switching device can be provided with a flexible hose having a first end connected to the nozzle of the second switching device and a second end connected or connectable with a source of compressed gaseous fluid. The nozzle of such second switching device is arranged to respectively establish communication with the discharge ends of the other and the one conduit in the first and second positions of such nozzle.

Another feature of the present invention resides in the provision of a method of transporting commodities (such as filter rod sections of unit length or multiple unit length) from the outlet (such as the only outlet) of a sending unit to the inlet (such as the only inlet) of a receiving unit along discrete first and second routes or paths. The method comprises the steps of conveying commodities along the first path, monitoring the first path for the presence of pileups of commodities (i.e., for the presence of accumulations of stagnant commodities in the first path), shifting from conveying of commodities along the first path to the conveying of commodities along the second path in response to detection of a pileup in the first path, and eliminating (e.g., pneumatically) the pileup in the first path.

As a rule, the method further comprises the steps of monitoring the second path for the presence of pileups of commodities during conveying of commodities along the second path toward the inlet of the receiving unit, shifting from conveying along the second path back to the conveying of commodities along the first path in response to detection of a pileup in the second path, and eliminating the pileup in the second path.

Each of the eliminating steps can comprise conveying along the respective path a compressed gaseous fluid in a direction from the inlet of the receiving unit toward the outlet of the sending unit.

The evacuation of commodities from the path containing a detected pileup of commodities can take place at the outlet of the article sending unit and preferably in the course of the respective pileup eliminating step.

As already mentioned hereinabove, the commodities can constitute rod-shaped articles, such as filter rod sections which can be joined with plain cigarettes, cigars or cigarillos to form therewith filter cigarettes, cigars or cigarillos.

It is preferred to start each shifting step at least substantially simultaneously with the start of the respective eliminating step.

The method can further comprise the steps of establishing a third path (such as by way of the aforementioned first flexible tube) between the outlet of the sending unit and the first and second paths, and establishing communication between the third path and the first path preparatory to conveying commodities along the first path; the first mentioned shifting step can include disconnecting the third path from the first path and simultaneously connecting the third path with the second path.

Still further, the improved method can include the steps of establishing or setting up an additional (fourth) path between the inlet of the receiving unit and the first and second paths, and establishing communication between the additional path and the first path preparatory to conveying of commodities along the first path. The first mentioned shifting step can include disconnecting the additional path from the first path and simultaneously connecting the additional path with the second path. The additional path can be defined by the aforementioned second flexible tube which connects the inlet of the receiving unit with the nozzle of the second switching device.

The novel features which are considered as characteristic of the invention are set forth in particular in the appended claims. The improved apparatus itself, however, both as to its construction and the modes of assembling and operating the same, together with numerous additional important and advantageous features and attributes thereof and of the method which can be practiced by resorting thereto, will be best understood upon perusal of the following detailed description of certain presently preferred specific embodiments with reference to the accompanying drawings.

BRIEF DESCRIPTION OF THE DRAWINGS

FIG. 2 is an enlarged view of a detail in the apparatus of FIG. 1, namely of a first switching device the mobile nozzle of which is shown in one of its in positions relative to the support of the first switching device, the section being taken in the direction of arrows as seen from the composite line A—A shown in FIG. 4;

FIG. 3 illustrates the structure of FIG. 2 but with the mobile nozzle of the first switching device shown in a different angular position relative to its support;

FIG. 4 is a sectional view as seen in the direction of arrows from the line B—B in FIG. 2;

FIG. 5 is a similar sectional view but showing the nozzle of the first switching device in a position corresponding to that depicted in FIG. 3;

FIG. 6 is an enlarged view of the second switching device in the apparatus of FIG. 1, the mobile nozzle of this switching device being shown in an angular position departing from that represented in FIG. 1, the section of FIG. 6 being taken in the direction of arrows from the line C—C of FIG. 8;

FIG. 7 shows the structure of FIG. 6 but with the second switching device in a different angular position;

FIG. 8 is a sectional view as seen in the direction of arrows from the line D—D of FIG. 6; and FIG. 9 is a similar sectional view but showing the nozzle of the second switching device in a different angular position relative to its support.

DESCRIPTION OF PREFERRED EMBODIMENTS

Figure 1:
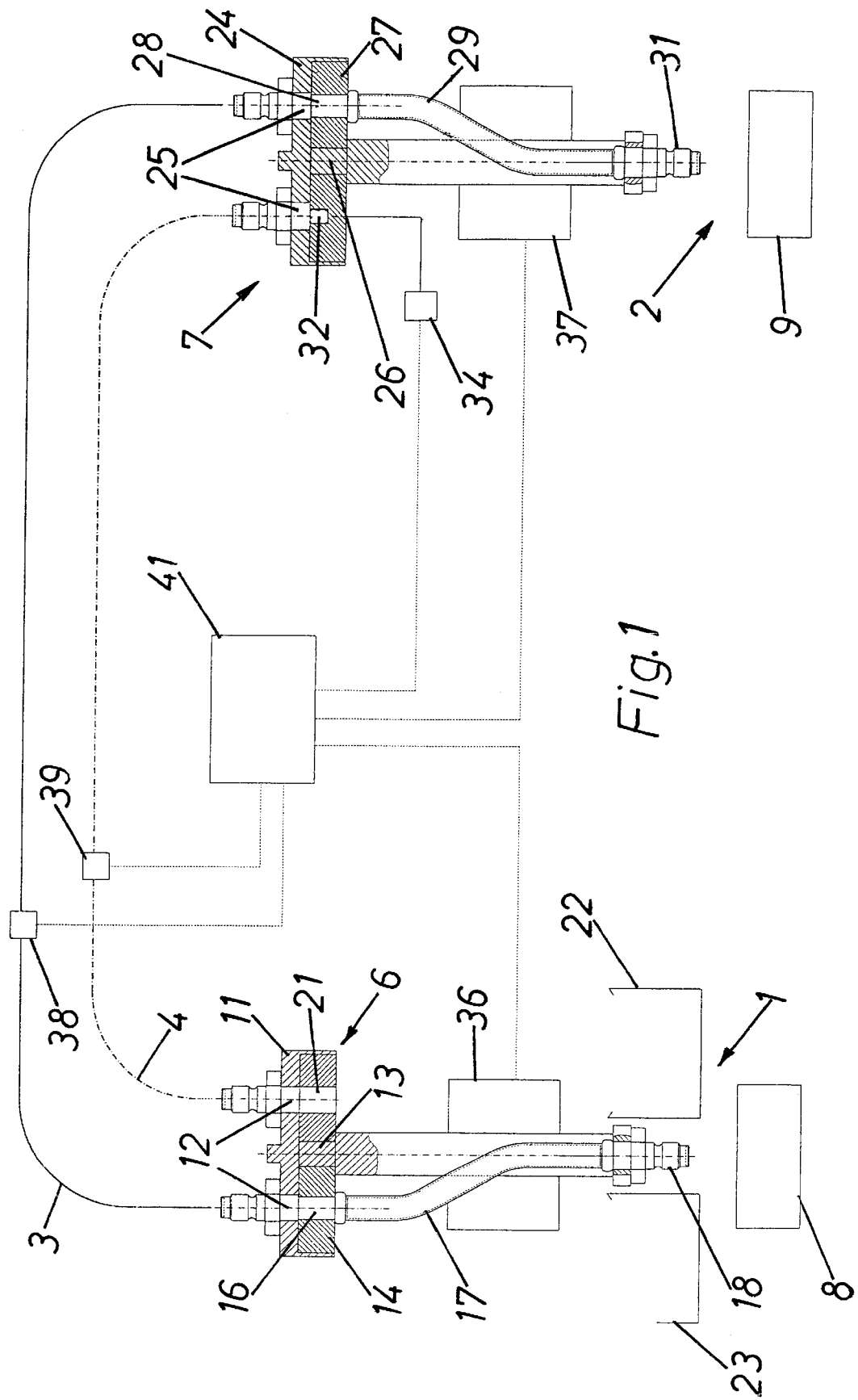
FIG. 1 is a schematic partly elevational and partly sectional view of a pneumatic transporting apparatus which embodies one form of the present invention and is set up to deliver a series of successive articles from the single outlet of an article sending unit, along one of two available routes or paths, and to the single inlet of an article receiving unit.

FIG. 1 shows an article sending unit 1, an article receiving unit 2, and an apparatus which serves to pneumatically transfer or convey successive articles (such as filter rod sections, not shown, of unit length or multiple unit length) from a single outlet 18 of the sending unit 1 to a single inlet 31 of the receiving unit 2. The apparatus comprises two elongated conduits 3, 4 having their receiving ends 12 attached to a rigid stationary housing or support 11 of a first switching device 6 receiving articles from the outlet 18. The discharge ends 25 of the conduits 3, 4 are affixed to the rigid stationary housing or support 24 of a second switching device 7 serving to discharge articles into the inlet 31.

The sending unit 1 comprises or is constituted by a machine 8 known as "FILTROMAT" (distributed by the assignee of the present application) which is designed to manipulate filter rod sections between a maker (e.g., a machine of the type disclosed in the aforementioned U.S. '007 patent to Greve) and a processing machine. The receiving unit 2 comprises or is constituted by a machine known as "MAX" (also distributed by the assignee of the present application) which is a filter tipping machine, e.g., a machine of the character described and shown in the aforementioned U.S. '008 patent to Oesterling et al.

The receiving ends 12 of the conduits 3, 4 (which may but need not be flexible or include flexible sections) are or can constitute nipples or plugs which are sealingly embedded in or recessed into the stationary support 11 of the switching device 6. The support 11 includes a shaft 13 which defines an axis for an indexible nozzle 14 here shown as a turntable which can be caused to assume at least two different angular positions. This nozzle has a hole or bore 16 in the form of an axially parallel orifice or passage communicating with the interior of a flexible tube 17 (e.g., a hose) which is connected with the outlet 18 as well as with the nozzle 14. This tube 17 establishes a (third) path for the conveying of articles from the outlet 18 into a first path defined by the conduit 3 or into a second path defined by the conduit 4. More specifically, the tube 17 establishes a path between the outlet 18 and the receiving end 12 of the conduit 3 in that (first) angular position of the nozzle 14 which is shown in FIGS. 1 to 4. When the nozzle 14 is indexed to its second angular position, the orifice 16 communicates with the receiving end 12 of the second conduit 4, i.e., the receiving end 12 of the conduit 3 is sealed from the outlet 18 but the tube 17 cooperates with the conduit 4 to establish a composite path extending from the outlet 18 to the second switching device 7.

The means for indexing the nozzle 14 of the switching device 6 back and forth or in a single direction between its first and second positions can comprise a pneumatically operated motor, a hydraulic motor, an electric motor, an electromagnet or any other suitable drive 36. The indexing means 36 receives signals to turn or index the nozzle 14 from a suitable control unit 41.

The nozzle 14 is further provided with two evacuating orifices 19 and 21 having axes located at the same distance from the axis of the shaft 13 as the orifice or passage 16. FIG. 4 shows that the passage 16 is located midway between (i.e., that it is flanked by) the evacuating orifices 19 and 21. The orifice 21 communicates with the receiving end 12 of the conduit 4 and the orifice 19 is sealed from the receiving end 12 of the conduit 3 in the first angular position of the nozzle 14 but the situation is reversed when the nozzle 14 is caused (by the motor or drive 36) to assume its second angular position relative to the support 11.

The apparatus further comprises a receptacle preferably including two discrete containers 22 and 23. The container 22 can receive articles from the conduit 4 (by way of the latter's receiving end 12) when the switching device 6 is ready to supply or is in the process of supplying articles from the sending unit 1, via tube 17 and passage 16 of the nozzle 14 into the receiving end 12 of the conduit 3. The container 23 receives articles from the inlet 12 of the conduit 3 via evacuating orifice 19 when the tube 17 delivers articles from the outlet 18, via passage 16 of the nozzle 14, and into the receiving end 12 of the conduit 4.

The housing or support 24 of the second switching device 7 has a shaft 26 defining an axis for an indexible nozzle or turntable 27. This support is sealingly connected with the discharge ends 25 of the conduits 3 and 4. A passage or orifice 28 (such as an, axially parallel bore or hole) of the nozzle 27 communicates with the intake end of a flexible tube 29 which is further connected with the inlet 31 of the receiving unit 2. The nozzle 27 is indexible between the first angular position of FIG. 1 in which the discharge end 25 of the conduit 3 can discharge articles into the passage 28 and thence into the tube 29, and a second position in which the passage 28 establishes communication between the discharge end 25 of the conduit 4 and the intake end of the tube 29.

The upper side of the nozzle 27 (and/or the underside of the support 24) has an arcuate groove or channel 32. FIGS. 1 and 6 to 9 show that the illustrated groove 32 is provided in the upper side of the nozzle 27 and is sealingly overlapped by the underside of the stationary support 24 of the second switching device 7. FIG. 7 shows a portion of a flexible hose 33 which connects the groove 32 with a port of a valve 34 representing or forming part of a source of a suitable compressed gaseous fluid (normally air). The valve 34 can be opened or sealed by the aforementioned control unit 41 to admit compressed air into the groove 32 and thence into the discharge end 25 of the conduit 3 or 4 in order to eliminate (expel) pileups (blocked accumulations) of articles in the respective conduits, i.e., to eliminate pileups and to thus unclog the conduit 3 or 4. The thus expelled articles are gathered in the container 23 or 22.

The means for indexing (moving) the nozzle 27 relative to the support 24 of the second switching device 20 7 comprises a motor or another suitable drive 37 which is (or which can be) identical with the motor or drive 36 and which also receives signals from the control unit 41.

The apparatus further comprises two monitoring means or sensors including the aforementioned sensor 38 in or at the conduit 3 and a similar sensor 39 in or at the conduit 4. These sensors transmit appropriate signals to the respective inputs of the control unit 41 when they detect stagnant accumulations (or slowly advancing accumulations) of articles in the respective conduits. The sensors 38, 39 can respond to changes of air pressure within the respective conduits 3 and 4 and/or to mechanical stresses exerted by the piled-up articles. It is clear that the sensors 38, 39 can be replaced by (or employed jointly with) sensors which monitor the supply of rod-shaped articles in the filter tipping Be machine 9 of te article receiving unit 2; all that counts is that the control unit 41 receive signals denoting pileups of articles in the conduit 3 or 4.

The exact construction of the motors or drives 36, 37, of the valve 34, of the sensors 38, 39 and of the control unit 41 form no part of the present invention. These parts can constitute commercially available commodities which are assembled to enable the apparatus of the present invention to operate in a manner as will be described below.

The operation is as follows:

Under normal circumstances, the outlet 18 of the sending unit 1 propels successive articles of a series of such articles into the receiving end 12 of one of the conduits 3, 4 by way of the switching device 6, and the discharging end 25 of the one conduit supplies articles for delivery to the inlet 31 of the receiving unit 2 by way of the switching device 7. That setting of the apparatus which exists when the composite path from the outlet 18 of the sending unit 1 to the inlet 31 of the receiving unit 2 is established by way of the tube 17, conduit 3 and tube 29 is shown in FIGS. 1, 4 and 9. At such time, the passage 16 of the nozzle 14 permits articles to pass from the tube 17 into the receiving end 12 of the conduit 3, and the passage 28 of the nozzle 27 permits articles to pass from the discharge end 25 of the conduit 3 into the tube 29. At the same time, the evacuating orifice 21 of the nozzle 14 is in a position to discharge articles from the receiving end 12 of the conduit 4 into the container 22. Furthermore, the discharging end 25 of the conduit 4 is communicatively connected with the hose 33 by way of the groove 32 in the nozzle 27 of the switching device 7.

If the just outlined circumstances prevail subsequent to indexing of the nozzles 14, 27 to the angular positions of FIGS. 1, 4 and 9 pursuant to detection (by the sensor 39) of an article pileup in the conduit 4, the control unit 41 causes (or has already caused) the valve 34 to admit compressed air into the hose 33. Thus, the groove 32 admits (or has already admitted) compressed air into the discharging end 25 of the conduit 4 and such compressed air expels (or has already expelled) the piled-up articles from the conduit 4 (by way of its receiving end 12) through the evacuating orifice of the nozzle 14, and into the container 22. Consequently, the conduit 4 is again ready to deliver articles from the tube 17 into the tube 29, and this takes place as soon as the sensor 38 detects a pileup of articles in the conduit 3, i.e., in response to renewed indexing of the nozzles 14 and 27.

It will be seen that the elimination of a pileup of articles in the conduit 3 or 4 does not necessitate any (or any noticeable) interruption of delivery of articles from the sending unit 1 to the receiving unit 2.

If the sensor 38 detects a pileup of articles in the conduit 3, its signal to the control unit 41 induces the latter to immediately and synchronously activate the drives 36 and 37 so that the nozzle 14 delivers articles from the tube 17 of the switching device 6 into the receiving end 12 of the conduit 4 and the nozzle 27 of the switching device 7 enables the discharging end 25 of the conduit 4 to deliver articles into the tube 29. At the same time, the groove 32 connects the hose 33 with the discharging end 25 of the conduit 3 and the receiving end 12 of the conduit 3 can discharge the articles of the detected pileup via evacuation orifice 19 into the container 23. Moreover, the control unit 41 induces the valve 34 to admit compressed air into the discharging end 25 of the conduit 3 via hose 33 and groove 32 so that the expulsion of piled-up articles from the conduit 3 can begin practically simultaneously with the indexing of the nozzles 14 and 27. In other words, the conduit 3 is or can be again ready to convey articles from the tube 17 into the tube 29 practically instantaneously or immediately upon the aforementioned indexing of the nozzles 14, 27 to the angular positions in which the pneumatic delivery of articles to the receiving unit 2 takes place via conduit 4. FIGS. 5 and 8 illustrate those angular positions of the nozzles or turntables 14, 27 in which the delivery of articles to the receiving unit 2 takes place via conduit 4. The evacuating orifice 19 then dwells in an angular position in which it can discharge articles supplied by the receiving end 12 of the conduit 3 into the container 23, e.g., by gravity flow.

An important advantage of the improved apparatus is that the unit 2 can receive articles, practically without interruption, in the event of a pileup of articles between a single outlet (18) and a single inlet (31). This contributes to compactness and lower cost of the apparatus. Moreover, the output of the filter tipping machine 9 can remain constant; this is important in modern high-speed machines which are capable of turning out huge quantities of filter-tipped smokers' products per unit of time.

Another important advantage of the improved method and apparatus is that a clogged conduit (3 or 4) can be emptied without any or without undue delay so that the unit 2 can receive an uninterruped flow of articles even in the event of a clogging of the conduit 3 or 4 immediately following a clogging of the conduit 4 or 3.

A further important advantage of the improved apparatus is that each of its switching devices 6, 7 can perform several important functions. Thus, the switching device 6 can direct first articles from the outlet 18 into the receiving end 12 of the conduit 3 or 4 while simultaneously directing articles from a freshly discovered pileup into the container 22 or 23. The switching device 7 can direct fresh articles into the inlet 31 from the discharge end 25 of the conduit 3 or 4 while simultaneously directing a flow of compressed gaseous fluid from the hose 33 (i.e., from the source of compressed fluid) into the discharge end 25 of the conduit 4 or 3. Each of the two conduits 3, 4 also serves the dual purpose of conveying fresh articles from the sending unit 1 toward the receiving unit 2, or of conveying articles from a pileup in the opposite direction. The aforedescribed highly versatile switching devices 6 and 7 are believed to merit patent protection even if employed in apparatus departing radically from the pneumatic apparatus shown in FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of pneumatically conveying rod-shaped articles or the like and, therefore, such adaptations should and are intended to be comprehended within the meaning and range of equivalence of the appended claims.

What is claimed is:

1. Apparatus for pneumatically transferring successive articles of a series of articles from an outlet of a single article sending unit to an inlet of a single article receiving unit, said outlet of said sending unit being arranged to discharge a series of rod-shaped articles of the tobacco processing industry, the apparatus comprising:

at least two conduits having article receiving ends separable connectable with said outlet and article discharging ends separably connectable with said inlet; and means for selectively connecting one of said at least two conduits with said units and for simultaneously disconnecting the other of said at least two conduits from said units, wherein said connecting and disconnecting means comprises a first switching device operable to connect said outlet with the receiving end of one of said at least two conduits, a second switching device operable to connect said inlet with the discharging end of one of said at least two conduits, and means for synchronously operating said devices so that in a first position of said devices connections are established between said outlet and one of the at least two conduits and between said inlet and the one conduit, while connections are interrupted between the outlet and the other of the at least two conduits and between the inlet and the other conduit, and in a second position of said devices connections are established between said outlet and the other conduit and between said inlet and the other conduit, while connections are interrupted between the outlet and the one conduit and between the inlet and the one conduit.

2. The apparatus of claim 1, wherein each of said switching devices comprises a support and a nozzle movable relative to the respective support between the first position in which said nozzles simultaneously establish communication only between said outlet and the receiving end of said one conduit as well as between the discharging end of said one conduit and said inlet and the second position in which said nozzles simultaneously establish communication only between said outlet and the receiving end of said other conduit as well as between the discharging end of said other conduit and said inlet.

3. The apparatus of claim 2, wherein each of said supports comprises a shaft and said nozzles include turntables turnable relative to the shaft of the respective support between their respective first and second positions.

4. The apparatus of claim 2, wherein said first switching device further comprises a first flexible tube connecting said outlet with the respective movable, nozzle, said second switching device further comprising a second flexible tube connecting said inlet with the respective movable nozzle.

5. The apparatus of claim 4, wherein the nozzle of said first switching device has first and second article evacuating orifices registering with the receiving ends of said one conduit and said other conduit in each of said positions of the nozzle of said first switching device, the nozzle of said second switching device having an article evacuating groove registering with the discharging ends of said other conduit and said one conduit in the first and second positions, respectively, of the nozzle of said second switching device.

6. The apparatus of claim 5, further comprising a receptacle arranged to receive articles issuing from the evacuating orifices of the nozzle of said first switching device.

7. The apparatus of claim 6, wherein said receptacle includes a plurality of containers one of which is positioned to receive articles issuing from one evacuating orifice of the nozzle of said first switching device in the first position of such nozzle and another of which is positioned to receive articles issuing from the other evacuating orifice of the nozzle of said first switching device in the second position of such nozzle.

8. The apparatus of claim 5, wherein the nozzle of said first switching device is indexible relative to the respective support about a predetermined axis, said evacuating orifices of the nozzle of said first switching device and an additional orifice provided in said support of said first switching device and communicating with said one conduit in the first position of the nozzle of said first switching device being equidistant from said axis and said additional orifice being located midway between the evacuating orifices of the nozzle of said first switching device.

9. The apparatus of claim 2, wherein at least one of the nozzle and the support of said second switching device defines a channel and further comprising a source of compressed air connectable with said channel, said channel communicating with the discharging end of said other conduit in one position and with the discharging end of said one conduit in the other position of the nozzle of said second switching device.

10. The apparatus of claim 2, wherein said second switching device further comprises a flexible hose having a first end connected to the nozzle of said second switching device and further comprising a source of compressed gaseous fluid connectable to a second end of said hose, said nozzle of said second switching device being arranged to respectively establish communication with the discharging ends of said other and said one conduit in the first and second positions thereof.

* * * * *